United States Patent [19]
Ji

[11] Patent Number: 5,497,206
[45] Date of Patent: Mar. 5, 1996

[54] CIRCUIT FOR CONTROLLING AN AUDIO SIGNAL OUTPUT OF A TELEVISION

[75] Inventor: Sung Y. Ji, Seoul, Rep. of Korea

[73] Assignee: Samsung Electronics Co., Ltd., Kyungki-do, Rep. of Korea

[21] Appl. No.: 298,741

[22] Filed: Aug. 31, 1994

[30] Foreign Application Priority Data

Aug. 31, 1993 [KR] Rep. of Korea ............... 1993-17374

[51] Int. Cl.⁶ ............................................. H04N 5/60
[52] U.S. Cl. ........................... 348/738; 348/485; 381/11
[58] Field of Search ................................ 348/738, 729, 348/480, 485; 381/7, 2, 3, 11; 455/149; H04N 5/60

[56] References Cited

U.S. PATENT DOCUMENTS 4,239,939 12/1980 Griffis ................................ 348/738
4,703,501 10/1987 Sugai et al. ........................ 381/11
5,187,576 2/1993 Na ...................................... 358/144

Primary Examiner—James J. Groody
Assistant Examiner—Glenton B. Burgess
Attorney, Agent, or Firm—Sughrue, Mion, Zinn, Macpeak & Seas

[57] ABSTRACT

A circuit for controlling the audio signal output of a television, in which it is determined whether video and audio signals are input from an external source, such as a video tape recorder. If so, then the audio output signals are properly controlled according to whether the audio signal are mono or stereo-type signals. The circuit includes an audio input state detecting circuit for determining the audio input state by employing an exclusive OR gate and at least two analog/digital converters, and a video signal detecting circuit for detecting whether or not video signals are input. A switching circuit performs switching operations through an AND gate which logically combines the output of the audio signal state detecting circuit and the output of the video state detecting circuit. Therefore, even in the case where the audio signal is a mono-type signal, a quasi-stereo sound is output through both left and right speakers.

5 Claims, 1 Drawing Sheet

# CIRCUIT FOR CONTROLLING AN AUDIO SIGNAL OUTPUT OF A TELEVISION

BACKGROUND OF THE INVENTION

1. Field of the Invention

The present invention relates to a circuit for controlling the audio signal output of a television in which there is made a decision as to whether video and audio signals are input from an external signal source, and then the audio output signals are properly controlled according to whether the input audio signal is of a mono or stereo-type.

2. Description of the Prior Art

Generally, a television receiver either receive a signal from transmitted radio waves coupled through an antenna, or else receives video signals and the like from other signal sources in order to process them. That is, a television receiver can receive audio and video signals from a video cassette recorder (VCR) to display the video pictures on a screen, and outputs the audio signals through speakers to produce sound. In this case, the received audio signal may be a mono-type signal in which case the signal is supplied to only one of the left and right channels, or the signal may be a stereo-type signal in which the audio signal is supplied to both of the left and right channels.

In the case of a stereo-type signal, the audio signal which has been input into the respective left and right side channels is properly output through the speakers and thus, there is no problem. However, in the case of a mono-type signal in which the audio signal is supplied to only one of the two channels, the sound is output through only one speaker.

In an attempt to overcome the above-described difficulty of only outputting the sound through one speaker, as shown in FIG. 1, the conventional circuit for controlling the audio signal output of a television is configured such that the user must manipulate a mono/stereo selecting switch on the television. Thus, the audio signal which is input into one of the channels is manipulated to be supplied to both of the channels, so that the sound is output through both the left and right speakers, just as with a stereo-type signal.

Referring to FIG. 1, audio signals which are supplied from an external source, such as from a video cassette recorder, are input into first and second terminals 1 and 2. Then, the signals are supplied through capacitors C1 and C2 to an audio/video (A/V) switch 100.

The signals are processed by the A/V switch 100, and then the audio signals corresponding to the left and right channels are output through an amplifier (not shown) to a speaker (also not shown). A mono/stereo switch SW1, which when closed connects the first and second terminals, has the effect of connecting the left and right channel circuits.

The conventional audio signal control circuit as described above, operates in the following manner. If the audio signal which has been supplied from an external source is a stereo-type signal, then the user turns off switch SW1 so that the audio signals corresponding to the right and left channels and input into the first and second terminals are supplied to the A/V switch 100.

On the other hand, if the audio signal from an external source is a mono-type signal, then, the user turns on the switch SW1, so that the audio signal supplied to only one of the left and right channels, i.e., the first and second terminals, passes through both of the left and right channels and is supplied to the speakers, thereby producing a quasi-stereo sound.

However, in the conventional audio signal control circuit, there is the problem that the user must manually manipulate the switch.

Efforts to overcome this problem have been ceaselessly attempted. One example of these attempts is disclosed in U.S. Pat. No. 5,187,576. Here, pilot signals are employed to determine whether or not the audio signals are mono or stereo-type signals, and accordingly the user optionally switches over to a stereo-mode.

However, this technique also requires a user to select the type of sound to output, and is rather complicated.

SUMMARY OF THE INVENTION

The present invention is intended to overcome the above-described disadvantages of the conventional techniques.

Accordingly, it is the object of the present invention to provide a circuit for controlling an audio signal output of a television, in which audio signals and video signals supplied from an external source are respectively detected, and if video signals exist and audio signals are supplied to only one of the two channels, then a stereo sound can always be output.

In achieving the above object, the circuit for controlling the audio signal output of a television that receives separated audio signals from an external audio and video signal source includes: an audio signal determining circuit for determining whether the audio signals are a mono or stereo-type signals, and for generating a logic signal in accordance with the result of the determination; a control signal generating section for generating a control signal after logic-combining the output signal of the audio signal determining circuit and the video signals, if video signals exist; and a switching circuit for performing switching operations so as to constantly output a stereo sound regardless of whether the audio signal is a mono or stereo-type signal.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
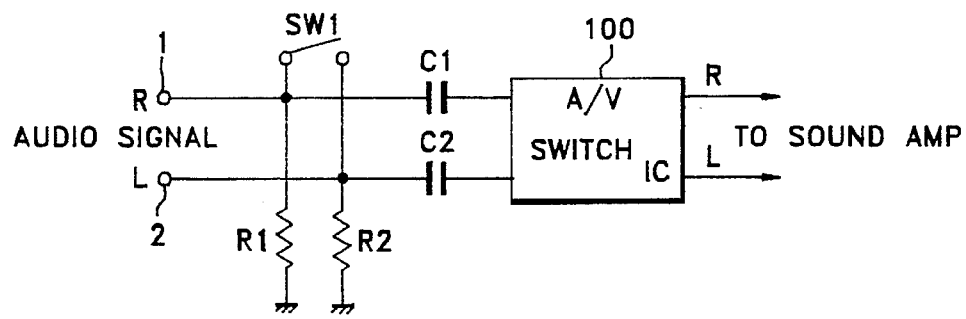
FIG. 1 illustrates a conventional circuit for controlling the audio signal output of a television.
Figure 2:
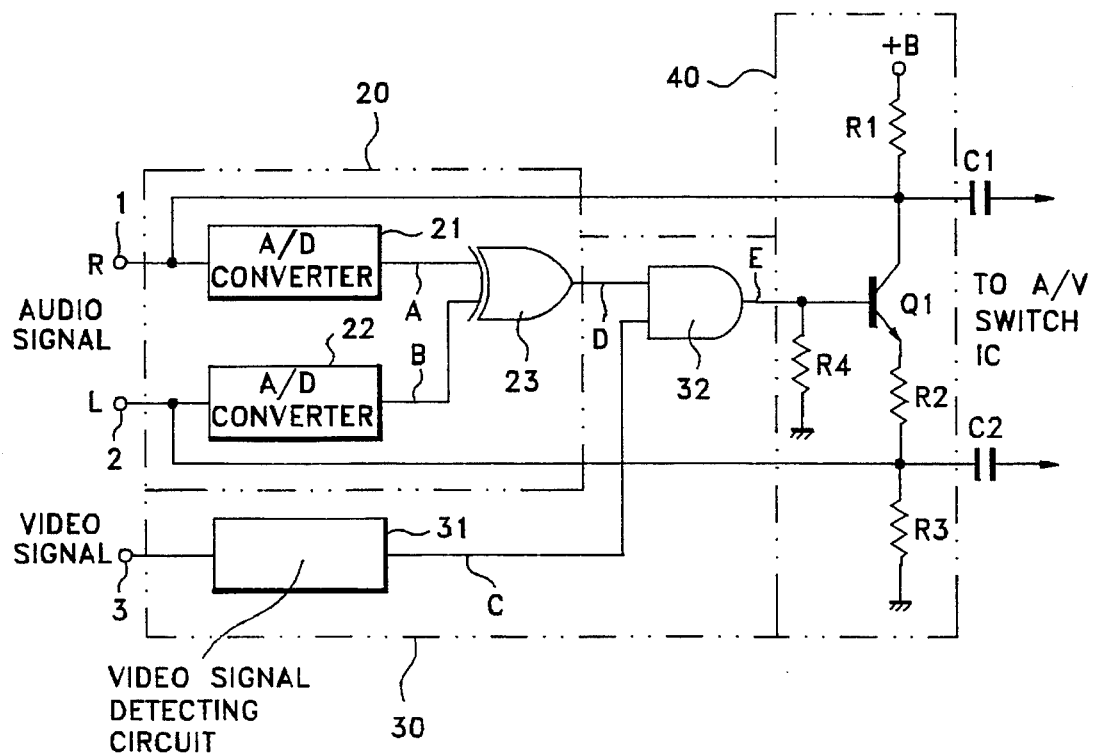
FIG. 2 illustrates the circuit for controlling the audio signal output of a television according to the present invention.

A circuit for controlling the audio signal output of a television according to the present invention is illustrated in FIG. 2.

As shown in FIG. 2, the circuit according to the present invention includes: an audio determining circuit 20 for determining whether or not externally applied audio signals are mono or stereo-type signals; a control signal generating circuit 30 consisting of an AND gate 32 for logically combining the output signal of the audio signal determining circuit 20 and the output of a video signal detecting circuit 31 for detecting video signals; and a switching circuit 40 for performing switching operations in accordance with the control signals output from of the control signal generating section 30.

The audio signal determining circuit 20 includes analog/digital (A/D) converters 21 and 22 for converting externally applied left and right channel analog audio signals to digital signals, and an exclusive OR gate 23.

The operation of the audio signal output control circuit according to the present invention as set forth above, is described below.

First, A/D converters 21 and 22 output high level signals if externally applied audio signals are received, and output low level signals if audio signals are not received. That is, if stereo-type audio signals are received from an external signal source as separate audio signals corresponding to the separate channels with the right channel audio signal applied to terminal 1 and the left channel audio signal applied to terminal 2, both of the A/D converters output high level signals. However, if mono-type audio signals are received and applied to one of the terminals 1 or 2, then only one of the A/D converters, corresponding to the terminal to which the mono-type signal is applied, outputs a high level signal.

When video signals are supplied from an external signal source, the video detecting circuit 31 separates synchronizing signals from the video signals, such as the horizontal sync pulses, and integrates the separated signals. As a result, the integrated value produces a high level output signal when a video signal is supplied to terminal 3. On the other hand, if a video signal is not supplied to terminal 3, then a low level signal is output from the video detecting circuit 31.

Therefore, the A/D converters 21 and 22 operate in such a manner that, if a mono-type audio signal is input, the exclusive OR gate 23 outputs a high level, and if stereo type audio signals are input, then the exclusive OR gate 23 outputs a low level. Meanwhile, AND gate 32 logically combines the output signals of the video signal detecting circuit 31 and the exclusive OR gate 23. The resultant signals are set forth in the truth table as shown in Table 1 below. The signals (i.e., A, B, C, etc.) correspond to the signals shown in FIG. 2. For example, signal E corresponds to the output signal of AND gate 32.

TABLE 1

| STATE | A | B | C | D | E |
|---|---|---|---|---|---|
| 1 | H | H | H | L | L |
| 2 | L | H | H | H | H |
| 3 | H | L | H | H | H |
| 4 | L | L | H | L | L |
| 5 | H | H | L | L | L |
| 6 | L | H | L | H | L |
| 7 | H | L | L | H | L |
| 8 | L | L | L | L | L |

As can be seen in Table 1 above, in the case where no video signals are input (i.e., C is low), and states 5 and 8 are relevant, and the output of the audio signal is not relevant.

Further, in the case where video signals are input, but audio signal are not input, state 4 applies and the output of the audio signal is not relevant. However, where video signals are input, and the externally applied audio signals are stereo-type signals, then state 1 applies. In the case of state 1, the AND gate 32 outputs a low level and, accordingly, NPN transistor Q1 in switching circuit 40 is turned off. Therefore, since the audio signals which are supplied to a first terminal 1 and a second terminal 2 are stereo-type signals, they are each output independently and directly to an audio/video switch IC (not shown).

In the case where video signals are input, and the externally applied audio signal is a mono-type signal, states 2 and 3 apply. In these states, AND gate 32 outputs a high level so that transistor Q1 of switching circuit 40 turns on. When transistor Q1 is turned on, even if the audio signal is input into only one of the left and right channels, the audio signal applied to either of the left or right channel is supplied to the audio/video switching IC. As a result, a quasi-stereo sound is produced through the speakers.

According to the present invention as described above, even in the situation where mono-type audio signals are input from an external source, the sound is output through both left and right channel speakers without requiring a user to manipulate a switch, thus simplifying the operation of the television.

The present invention is described on the assumption that the present invention is applied to the audio signal output control circuit for a television receiver, but it will be apparent to those of ordinary skill in the art that the teachings set forth herein can be extended to other apparatuses.

What is claimed is:

1. A circuit for controlling the audio signal output of a television having a plurality of audio output channels and which receives an audio signal provided from an external signal source, comprising:

an audio signal determination means for determining whether the received audio signal is a mono or stereo-type signal, and generating a logic signal in accordance with the result of the determination;

a video signal detecting means for receiving a video signal and outputting a video detection signal indicating whether or not the video signal is present;

a control signal generating means for generating a control signal after logically combining the logic signal output from said audio signal determination means and the video detection signal; and a switching circuit for switching the audio signal based on the control signal so as to always output a stereo sound regardless of whether the audio signal is a mono or stereo-type signal.

2. The circuit as claimed in claim 1, wherein said received audio signal is an analog signal having left and right channel components, and wherein said audio signal determination means comprises:

at least two analog/digital converters for converting the left and right channel components of the analog audio signal to digital signals; and an exclusive OR means for performing an exclusive OR operation on the outputs of said analog/digital converters.

3. The circuit as claimed in claim 1, wherein said switching circuit connects the output channels if a mono-type audio signal is detected, and disconnects the output channels if a stereo-type audio signal is detected.

4. A circuit for controlling the audio signal output of a television having a plurality of audio output channels and which receives an audio signal provided from an external signal source, comprising:

an audio signal determination unit for determining whether the received audio signal is a mono or stereo-type signal, and generating a logic signal in accordance with the result of the determination;

a video signal detecting unit for receiving a video signal and outputting a video detection signal indicating whether or not the video signal is present;

a control signal generator for generating a control signal after logically combining the logic signal output from said audio signal determination unit and the video detection signal; and a switching circuit for switching the audio signal based on the control signal so as to always output a stereo sound regardless of whether the audio signal is a mono or stereo-type signal.

5. The circuit as claimed in claim 4, wherein said received audio signal is an analog signal having left and right channel components, and wherein said audio signal determination unit comprises:

at least two analog/digital converters for converting the left and right channel components of the analog audio signal to digital signals; and an exclusive OR unit for performing an exclusive OR operation on the outputs of said analog/digital converters.

* * * * *